United States Patent
Bühler et al.

[11] Patent Number: 5,852,268
[45] Date of Patent: Dec. 22, 1998

[54] METHOD AND APPARATUS FOR FINE MACHINING WITH SPARK EROSION USING A WIRE ELECTRODE

[75] Inventors: Ernst Bühler, Losone; Marco Boccadoro, Verscio, both of Switzerland; Pierangelo Locati, Canobbio; Adriano Gironi, Verbania, both of Italy; Stefano Angelella, Losone; Livio Mazzolini, Capriasca, both of Switzerland

[73] Assignee: Agie Sa, Losone, Switzerland

[21] Appl. No.: 647,238

[22] Filed: May 9, 1996

[30] Foreign Application Priority Data

May 9, 1995 [DE] Germany ............. 195 16 990.5

[51] Int. Cl.⁶ ................. B23H 7/02; B23H 7/16
[52] U.S. Cl. ..................... 219/69.12; 219/69.16
[58] Field of Search ............ 219/69.12, 69.17, 219/69.13, 69.16

[56] References Cited

U.S. PATENT DOCUMENTS

| | | | |
|---|---|---|---|
| 3,671,705 | 6/1972 | Raznitsyn | 219/69.13 |
| 4,733,040 | 3/1988 | Pelloni et al. | 219/69.17 |
| 4,798,929 | 1/1989 | Itoh | 219/69.12 |
| 5,324,908 | 6/1994 | Masuda et al. | 219/69.12 |
| 5,475,195 | 12/1995 | Delpretti | 219/69.12 |

FOREIGN PATENT DOCUMENTS

| | | |
|---|---|---|
| 0 558 757 | 9/1993 | European Pat. Off. |
| 0 578 018 | 1/1994 | European Pat. Off. |
| 38 17 302 | 10/1989 | Germany. |
| 42 22 779 | 1/1993 | Germany. |
| 42 19 712 | 12/1993 | Germany. |
| 56-39828 | 4/1981 | Japan. |
| 56-56349 | 5/1981 | Japan. |
| 4-289026 | 10/1992 | Japan. |
| 6-277949 | 10/1994 | Japan. |
| 7-32218 | 2/1995 | Japan. |

OTHER PUBLICATIONS

Patent Abstracts of Japan; Publication No. 04289026; Publication Date Oct. 14, 1992.
European Search Report of Sep. 4, 1997 with US equivalents of German language references.
H. Meretz, "EDM: Fuzzy setzt sich durch", Werkstatt und Betrieb 126 (1993) 12, pp. 758–760.

Primary Examiner—Geoffrey S. Evans
Attorney, Agent, or Firm—Darby & Darby

[57] ABSTRACT

A method of and a spark erosion apparatus for fine machining by spark erosion of a workpiece (2) with a wire electrode (1) eliminates very efficiently process interruptions caused by short circuits, such that at least one gap parameter is continuously monitored for the purpose of detecting a short circuit; when a short circuit is detected, the forward motion of the electrode (1) is arrested at the point (K) where the short circuit occurred; if the short circuit persists, the electrode (1) is moved away from the workpiece (2) to an intervention point (M)—in a direction perpendicular to the path (6) used for trim cutting; at the intervention point (M), one or several measures to eliminate the short circuit are executed once or several times; and after it has been detected that the short circuit is eliminated, the electrode (1) is moved back to the point (K) where the short circuit occurred, whereafter normal machining continues.

27 Claims, 2 Drawing Sheets

METHOD AND APPARATUS FOR FINE MACHINING WITH SPARK EROSION USING A WIRE ELECTRODE

BACKGROUND OF THE INVENTION

1. Field of the Invention

The invention relates to a method and a spark erosion apparatus for trim cutting by spark erosion, i.e. fine machining, of a workpiece with a wire electrode, where at least one gap parameter is continuously monitored for the purpose of detecting a short circuit.

It is known that the shape and the surface quality of workpieces can be improved significantly, after the full thickness has been cut, by trim cutting them once or several times using pulses of decreasing energy. Usually, the contour is repeated several times with suitable offsets and an essentially constant rate of feed is used when the pulse energy falls below a preset limit value.

2. Description of the Related Art

Problems arise when the process is interrupted due to short circuits, because material is not removed and striations in the shape of bumps are created on the workpiece. Depending on the duration of the short circuit, these bumps may be invisible (i.e. smaller than about 0.4 $\mu$m); however, these bumps can also extend spatially over several micrometer which can cause a problem.

Attempts were made to reverse the movement of the wire electrode from the time a short circuit occurs until the short circuit is eliminated, and to subsequently resume the erosion process in the forward direction.

Another known method is to melt down or break up the short circuit via Joule heating using pulses of higher energy (U.S. Pat. No. 3,671,705—RAZNITSYN).

Furthermore, it is known from machining by vertical (die-sinking) erosion, that—after a short circuit—the electrodes should not be withdrawn along the same path that was previously used for cutting, but that the electrode should be moved over to an escape path which is calculated beforehand (DE 38 17 302-C—AGIE and U.S. Pat. No. 4,733,040—AGIE).

In addition, a modification of this method has been proposed for wire cutting (JPOS 4-289026—FANUC and EP-0 578 018-A1—AGIE). Herein, transverse servo motion is employed.

Finally, the problem associated with the elimination of short circuits is also addressed in EP 0 558 757—FANUC.

The known solutions are in many aspects not satisfactory.

The high-frequency finishing pulses which are presently used for trim and precision cutting, can cause erosion over a spatially extended region, i.e. over a gap width of several micrometers. This gap width is often referred to as the pulse-related gap width. But this is not the actually occurring mechanism. Rather, the wire electrode is pulled toward the workpiece by electrodynamic forces such that discharge conditions are maintained over an extended region.

As a result of this effect, the region containing the reverse path is eroded once again—after the short circuit had been eliminated by reverse motion and subsequent forward motion. This creates significant errors in the form of deeper striations. Furthermore, this method for eliminating short circuits is inefficient and leads to servo instabilities.

The pulses of high energy which are used for melting down or breaking up a short circuit (short circuit break-up pulses) as taught in to U.S. Pat. No. 3,671,705, are somewhat more effective. If these pulses, however, are used during the fine machining operation to break up short circuits, they invariably create bothersome craters with a diameter of 50 $\mu$m and more in the already eroded surface. Current pulses significantly higher than 20 A are required to melt down the bridges causing the short circuit. Consequently, this method is not applicable to fine machining, at least not in the aforementioned manner.

The escape strategies which are used in the vertical erosion process, and the transverse servo motions which are used in the wire cutting process, provide only a partial solution to the short circuit problem. In most situations, the cutting during the fine machining operation is carried out with the waster still in place. This does not leave enough space to dislodge the short circuits efficiently, without creating a new short circuit with the waster. In addition, existing contour errors can still further restrict a transverse servo motion, especially in sharp corners, e.g. in a corner following an entry path, i.e. a path which leads from the start hole to the contour of the cut. If the short circuit cannot be eliminated, the servo system will be permanently blocked.

Contrary to expectations, short circuits during fine machining can be rather persistent. It has been observed that ferromagnetic material containing elements like iron, nickel, and cobalt is preferably deposited in the gap. This happens because the cut disturbs the magnetic fields inside the workpiece, deflects them to the outside and hereby pulls the magnetizable particles in the suspension into the gap. The known methods were not able to solve this problem either.

SUMMARY OF THE INVENTION

It is the object of the invention to efficiently eliminate short circuits during fine machining by spark erosion.

The invention is intended to meet these objectives.

Accordingly, the problem is solved by a method for trimming (fine machining) a workpiece by spark erosion with a wire electrode, wherein a) at least one gap parameter is continuously monitored in order to detect short circuits;

b) when a short circuit is detected, the forward motion of the electrode is arrested at the point where the short circuit occurred;

c) if the short circuit persists, the electrode is moved away from the workpiece to an intervention point—in a direction perpendicular to the path used for trim cutting;

d) at the intervention point, one or several measures to eliminate the short circuit are executed once or several times; and e) after the elimination of the short circuit has been detected, the electrode is moved back to the point where the short circuit occurred, whereafter normal machining continues.

Further, the problem is also solved by a spark erosion apparatus for trim cutting (fine machining) a workpiece by spark erosion with a wire electrode, the apparatus comprising:

a) means for continuously monitoring of at least one gap parameter in order to detect short circuits, and b) control means connected to the monitoring means, said control means designed in such way that b.1) it arrests the forward motion of the electrode at the point where the short circuit occurred, when an output signal indicating a short circuit is received from the monitoring means;

b.2) it moves the electrode away from the workpiece —in a direction perpendicular to the path used for trim cutting—to an intervention point if the short circuit persists;

b.3) it executes at this point once or several times one or several measures for eliminating the short circuit; and b.4) it moves the electrode back to the point where the short circuit occurred, after receiving a signal indicating that the short circuit has been eliminated, whereafter normal machining continues.

In particular, the invention has the following advantages: the erosion process is much more tolerant toward breakdowns and malfunctions. This enhances the stability of the process. In addition, in spite of the intervention during short circuits, the surface of the workpiece is not damaged. Also, an automatic intervention during short circuits and an automatic optimization of the intervention process become feasible. In general, the quality of fine machining improves significantly, without increasing the investment cost and without making the operation of the equipment more difficult.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

Further embodiments of the invention are listed in the dependent Claims.

The invention is described in greater detail hereinafter with reference to the embodiments and the attached drawing.

DETAILED DESCRIPTION OF THE PRESENTLY PREFERRED EMBODIMENTS

Figure 2:
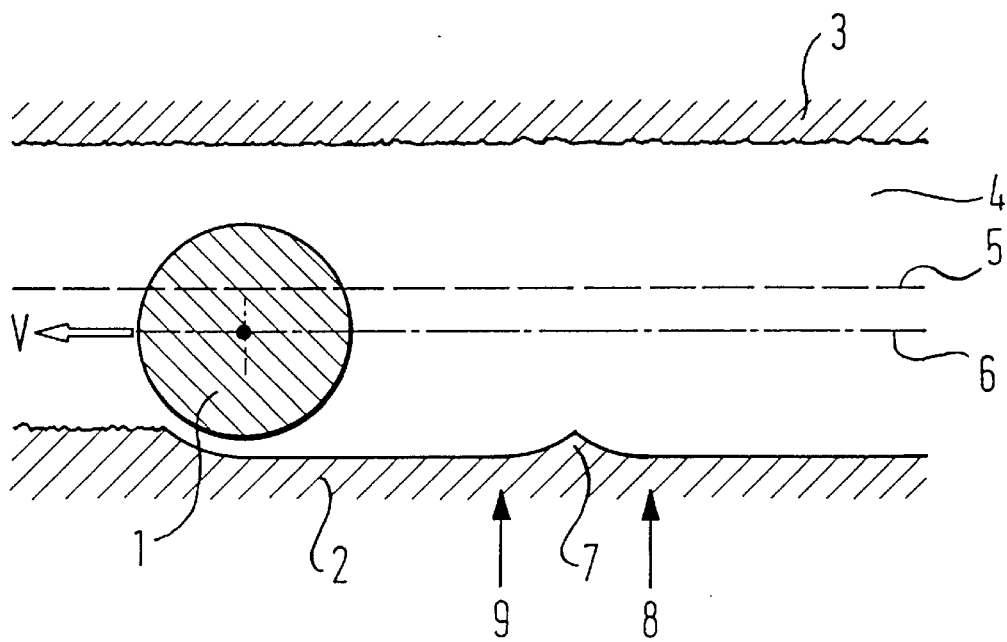
FIG. 2 shows the known errors which occur at constant rate of feed when no material is removed.
Figure 3:
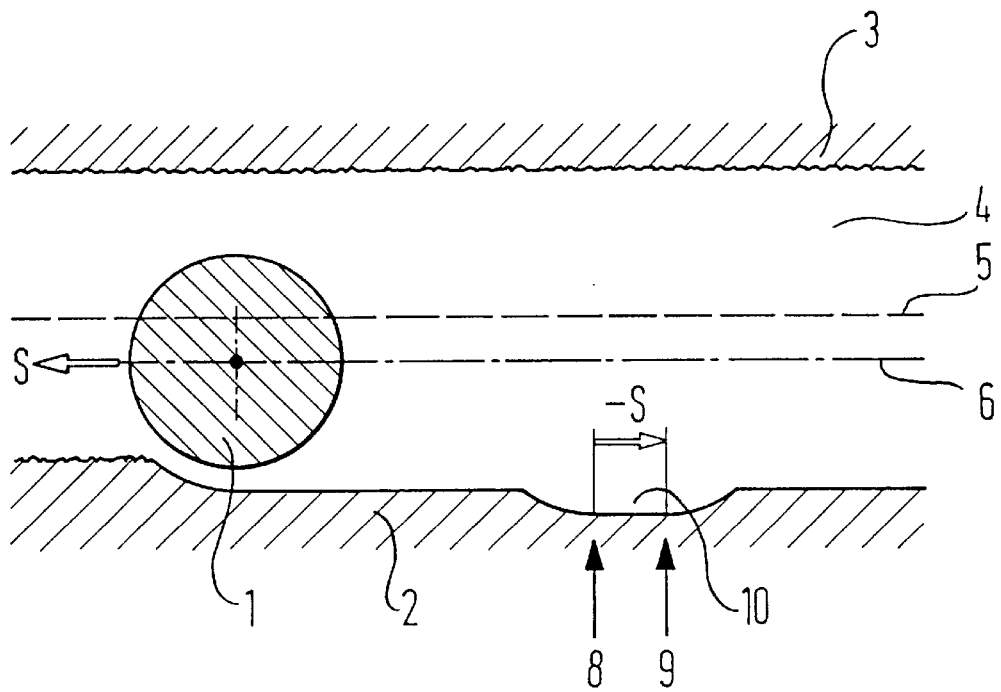
FIG. 3 shows the known errors which occur as a result of "double removal" during a reverse servo motion.
Figure 4:
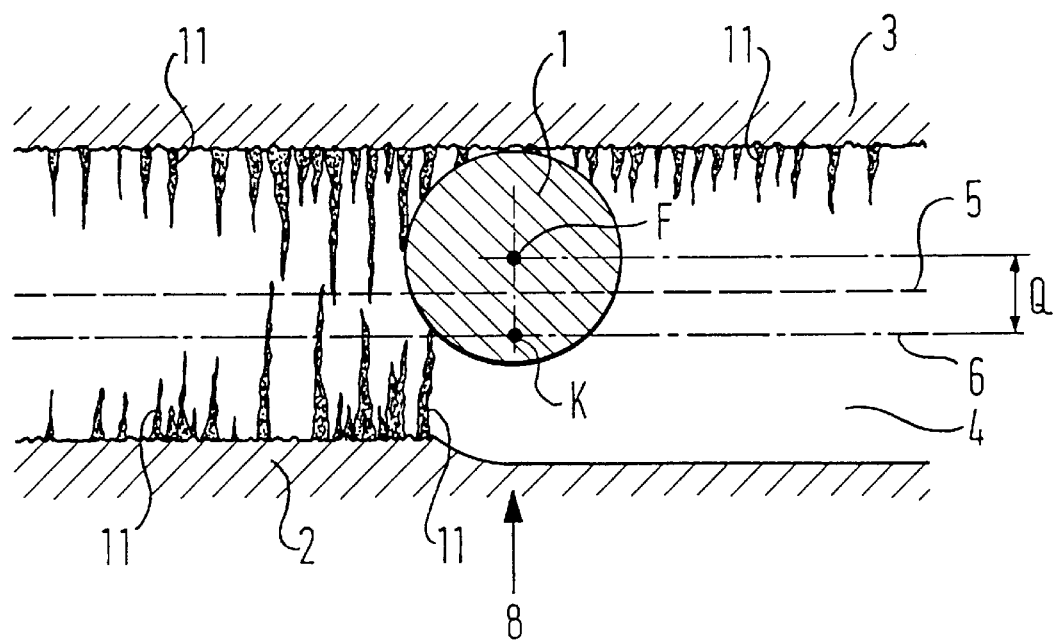
FIG. 4 shows a known situation where particles are held inside the gap by magnetic forces and where transverse movements of the servo are not able to dislodge the short circuit.

In order to provide a better understanding of the invention, the present state-of-the-art as shown in FIGS. 2 to 4 will first be discussed.

FIG. 2 shows a significantly enlarged and enhanced cross section through the erosion zone. Here, in a first trim cut, the wire electrode 1 is moved at a constant rate of feed V on a trim cutting path 6 which is offset from the path 5 for the full thickness cut. The waster 3 was not removed after the full thickness cut, as is rather common. Because of the commonly finer settings for the trim cut, the surface of the workpiece 2 becomes smoother and closer to its intended shape. Sitting in the gap 4 are not only a flushing agent, normally deionized water, but also small particles stemming from the material eroded from the workpiece 2 and the wire electrode 1; furthermore, there exist decomposition products of the flushing agent in the form of gas bubbles as well as air bubbles which enter via the moving flushing agent.

It will now be assumed that a short circuit occurs and, as a result, no further erosion takes place from the beginning 8 of the short circuit until its spontaneous termination 9. As a result, material 7 which is not removed, forms a protruding mark across the entire height of the workpiece. Such faults are highly undesirable, since they can only rarely be smoothed out, even during subsequent trim cuts, due to the short intervention period. These marks become more visible with increasing smoothness of the machined surface. In the example given here, the marks become visible with the naked eye when the duration of the short circuit exceeds a critical value of approximately 400 ms.

High-quality servo systems are indeed able to react within the aforementioned time period of 400 ms. For this reason, the method depicted to FIG. 3 is used for solving the above problem. Here, the wire electrode 1 is moved on a trim cutting path 6 with a controlled servo speed S. This is accomplished by measuring a gap parameter, e.g. the average operating voltage, and comparing this measured value to a nominal value. The comparative result is transmitted to a special speed controller which in turn transmits the servo speed S to the drives for the axes. In the event that a short circuit is detected, the speed controller outputs a reverse servo speed—S. With this, the wire electrode 1 is moved backwards between the beginning 8 of the short circuit and its end 9. The next advance results in a double removal 10, here in form of a groove, which again extend across the entire height of the workpiece. The disadvantages here are essentially the same as those in the method of FIG. 1. Adaptive corrections of the generator pulses or the rate of feed in this region do not achieve the intended objective since the machining process becomes unstable.

The situation in gap 4, as shown in FIG. 4, is reminiscent of a stalagmite cave and can indeed occur in a poorly demagnetized workpiece. The magnetic fields are induced into the workpiece mostly by magnetic gripping fixtures during a preceding grinding process and can only be eliminated superficially, even with sophisticated demagnetizing devices. As a result, magnetized particles 11 are deposited on the waster 3 as well as on the workpiece 2. Hereby, these particles 11 orient themselves along the field lines and can bridge the gap 4. The flushing pressure of only 0.5 bar which is common during the trim cuts, is too weak to remove the magnetic particles 11 from the processing region.

The known methods which utilize transverse servo motion, obviously fail under these circumstances. The wire electrode 1 which is located at point K when the short circuit 8 begins, can at most travel across the transverse servo path Q to the escape point F. Hereby, the short circuit is usually not eliminated which invariably leads to a permanent interruption of the machining process.

Figure 1:
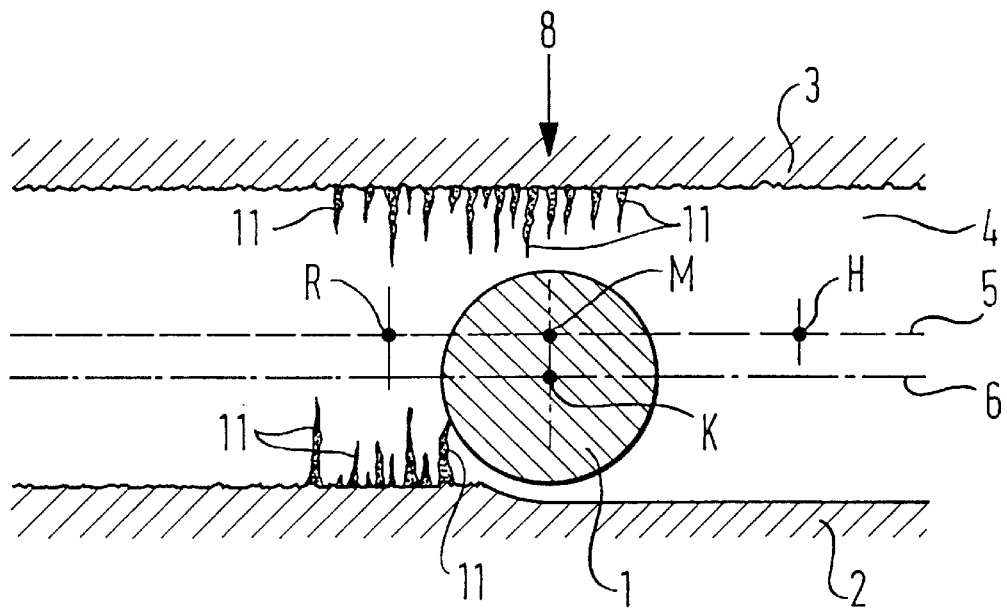
FIG. 1 shows the occurrence of a short circuit with the method according to the invention.

The conditions for the method according to the invention are illustrated in FIG. 1. At the beginning of a short circuit 8, the wire electrode 1 is first stopped at the point K where the short circuit occurred—regardless if it was advanced at a constant rate of feed V or at a servo speed S. The wire electrode 1 is subsequently moved away from the workpiece 2 to an intervention point M; this intervention point M is preferably located on the path 5 which was used for full thickness cutting. At the intervention point M, much more forceful measures are feasible for eliminating the short circuit without damage to the workpiece 2. Experiments, for instance, have demonstrated that even short circuit break-up pulses with an amplitude of 400 A and a duration of 3 $\mu$s do not leave any traces on the trimmed surface, if they are initiated at the intervention point M. It was also noticed that such pulses rarely exceed 100 A—which shows that this method is very efficient for disrupting short circuits.

As soon as it is detected that the short circuit is eliminated, it is, of course, possible—during each phase of this process—to return immediately to the point K where the short circuit occurred, and to resume the normal machining operation at that point.

It is known that it can be extremely difficult to eliminate short circuits during trim cutting without damaging the workpiece 2. This is, because these short circuits occur stochastically and without warning. Known adaptive control systems are completely overtaxed since meaningful input parameters are lacking.

It has been demonstrated experimentally that there exist several underlying causes for these short circuits and that each cause has its characteristic signature. Short circuits which are caused by, for instance, deposits of magnetic particles 11, occur only when magnetic materials are machined, like tool steel, certain nickel alloys, and hard alloys having a cobalt binder phase. These short circuits typically last between 100 ms and several seconds. The short circuit is most successfully eliminated by flushing pulses, by pulses to disrupt the short circuit, and by a cleaning motion toward the cleaning point R of the wire electrode 1. Poor quality of the wire, like scale deposits, burrs, or bends, exhibit a short circuit duration which is directly proportional to the height of the workpiece and inversely proportional to the rate of the wire feed; for instance, for a height of the workpiece of 50 mm and a rate of feed of 100 mm/s, the short circuit duration is 0.5 seconds. The short circuit is most successfully eliminated by moving from the point K where the short circuit occurred, to the intervention point M.

There are also known wire cleaning devices and wire alignment devices which can at least mitigate the aforementioned wire defects. The cleaning operation is mostly carried out by drawing dies, brushes and/or felts, and the alignment operation by annealing and/or pull-draw devices. For trouble shooting, these devices are preferably turned on and off, i.e. activated and deactivated. This makes it possible to enact countermeasures or to propose solutions to the operator by, for instance, sending the message: "Poor wire quality—change spool!"

Material separating from the wire can precipitate in regions of the wire path where friction occurs, for instance at the current contacts or the wire guides; these deposits can then become welded to the wire and subsequently be pulled into the work zone. These phenomena cannot be separated from a poor wire quality. However, the resulting short circuits are of significantly shorter duration and can be permanently eliminated by a temporary, but significant increase in the wire feed rate. Air bubbles and gas bubbles generate short circuits as a result of diminished wire cooling, but these last only from 1 ms to 100 ms. This type of short circuit can best be eliminated by interrupting the processing pulses, since this gives the wire electrode enough time to cool.

All the aforementioned types of short circuits do rarely correlate with the geometry of the cut. There exist, however, situations where the cause for the short circuit is associated with the geometry. For instance, contour errors in the preceding cuts occur preferably at sharp corners. Also, displacements as a result of stress released in the workpiece mostly occur at or after corner in the path contour. The occurrence of the short circuits can only be reduced if the rate of feed V, the nominal control parameters for the servo speed S, or the offset value of the trim cutting path 6 are changed.

In addition, there are short circuits which can be traced to maintenance errors. These include worn current contact or defective conveyor belts for the wire electrode 1, defective wire cutting devices and dirty filters for the flushing agent. These types of short circuits, too, have characteristic signatures with respect to duration, cyclic occurrence and remedies that fail. These events cannot be eliminated by the system. The only possibility is to interrupt the machining and to inform the operator about the required maintenance or service procedures.

The foregoing descriptions are intended to demonstrate the complex relationships and causes of short circuits during fine machining with spark erosion. An operator cannot be expected to immediately recognize the required countermeasures or even to continuously monitor the process. Rather, this is the object of the method and of the apparatus of the invention. For this purpose, a standard set of responses and interventions is based on the experience and/or the knowledge of trained personnel or is programmed into the system. In addition, the system will be enabled to learn from its own experiences and thus to react more intelligently and with greater flexibility.

This can only be accomplished if the records of past intervention measures are saved, in particular the results which were obtained, for instance, the likelihood for a specific measure to be successful, i.e. the following information: How many attempts out of n attempts of a specific measure were successful.

It is also advantageous to save the following ratios: the number of short circuits divided by the length traveled during feed, or the frequency of short circuits divided by the curvature of the path; or saving the frequency of short circuits alone; in addition, taking into consideration a statistical distribution of, for instance, 3 classes of different short circuit durations: 0–10 ms, 11–100 ms, and longer than 100 ms.

The result will be an automatic compilation of a knowledge base after each processing run, which will enable the adaptation of an intervention strategy, i.e. an intervention in the event of a short circuit, based on defined rules.

Initially, intervention measures to eliminate short circuits will only address the symptoms according to a standard recipe. For instance, a move from the intervention point M to the stop point H and back is appropriate when such short circuits are to be eliminated which are induced by geometry. A move from the intervention point M to the cleaning point R and back, particularly in combination with a cleaning agent pulse, gives very good results for short circuits which are caused by deposits in the gap 4. Hereby, the region ahead of the point K where the short circuit occurred, is cleaned. If the wire quality is poor, the short circuit is eliminated rather quickly by changing the polarity of the processing pulse for a specified time. This process preferably removes possible bumps from the surface of the wire electrodes.

After the knowledge base has expanded, more effective measures can now be selected, implemented, and combined. After a certain time, it will be possible to pinpoint one or more underlying causes from the patterns which emerge based on the success quotas and on the various ratios.

This, on the other hand, allows the implementation of measures for eliminating these underlying causes in order to reduce the frequency of short circuits. Since the process interruption is not statistical in nature, these measures will, after a certain time, no longer be necessary. If the malfunction persists, it would again affect the knowledge base and start a new cycle. Since the knowledge base for these corresponding process problems has already been established, the reaction time for an intervention is much shorter when the same situation recurs. It is, of course, important to allow only measures which will not damage the shape or the surface quality of the workpiece 2.

This type of intelligent control means can be best implemented with fuzzy logic. The success quotas, the various ratios, and possibly their derivatives with respect to time are sent to an associated function which has been defined by an expert, and are then sent to a control system. The desired intervention measures are obtained following an output transformation. Fuzzy logic has the significant advantage that the system can almost be told with words, with so-called linguistic variables, how to react in certain situations. This is much simpler than using purely mathematical instructions or logical combinations, especially in view of the rather complex controlling factors.

These systems can basically be applied in two ways. Either these systems are already trained by the manufacturer for all conceivable applications by supervised learning, after which the acquired knowledge is saved in memory and copied for the user, i.e. the system is provided with long-term memory; or the system is only provided with basic rules and has to learn anew for each application which measures it should apply. The second alternative where the learning process is not supervised and where only short-term memory is present, has significant advantages in the situation here presented and will retain its usefulness in future applications which cannot be envisioned today.

A reference to working with fuzzy logic can be found in the book by C. Altrock, "Fuzzy logic Technologie," Oldenburg Verlag 1993, ISBN 3-486-22673-8. Documentation for the following software tools is provided in the manuals from INFORM GmbH, Aachen, Germany: "Fuzzy TECH 3.0 Neuro Fuzzy Module," "Fuzzy TECH 3.0 On-line Edition." These tools are ideally suited to implement the control algorithms discussed above.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for trim cutting by fine machining with spark erosion of a workpiece with a wire electrode, comprising the steps of:
   a) continuously monitoring at least one gap parameter for detecting a short circuit;
   b) arresting the forward motion of the wire electrode upon detecting a short circuit at a point (K) where the short circuit occurred;
   c) moving the electrode away from the workpiece to an intervention point (M) upon persisting of the short circuit, in the direction perpendicular to a trim cutting path;
   d) carrying out at least a first measure to eliminate the short circuit at the intervention point (M) at least one time;
   e) upon detecting the elimination of the short circuit, moving the electrode back to the point (K) where the short circuit occurred; and continuing machining.

2. The method according to claim 1, further comprising a step of applying at the intervention point (M) a flushing pulse having at least one of an increased pressure and flow for providing the first measure for short circuit elimination.

3. The method according to claim 1, further comprising a step of applying at the intervention point (M) a current pulse having an increased amplitude for melting down the short circuit for providing the first measure for short circuit elimination.

4. The method according to claim 1, further comprising a step of moving at the intervention point (M) the wire electrode parallel to the trim cutting path, from the intervention point (M) back to a stop point (H) and then again forward to the intervention point (M), for providing the first measure for short circuit elimination.

5. The method according to claim 1, further comprising a step of increasing for a period of time at least one of tension and speed of the wire at the intervention point (M), for providing the first measure for short circuit elimination.

6. The method according to claim 1, further comprising a step of discontinuing for a certain period of time at the intervention point (M) the processing pulse, for providing the first measure for short circuit elimination.

7. The method according to claim 1, further comprising a step of reversing for a period of time at the intervention point (M) the polarity of the processing pulses, for providing the first measure for short circuit elimination.

8. The method according to claim 1, further comprising a step of moving at the intervention point (M) the wire electrode parallel to the trim cutting path from the intervention point (M) forward to a cleaning point (R) and then back again to the intervention point (M), for providing the first measure for short circuit elimination.

9. A method according to claim 1, further comprising a step of selecting a variable for the path between the short circuit point (K) and the intervention point (M), the intervention point (M) and a stop point (H), and at least one of the intervention point (M) and a cleaning point (R).

10. A method according to claim 1, further comprising a step of locating the intervention point (M), at least one of a stop point (H), and a cleaning point (R) on a path for conducting a full thickness cut.

11. A method according to claim 1, further comprising a step of preselecting at least one of the following measures for short circuit elimination:
   applying at the intervention point (M) a flushing pulse having at least one of an increased pressure and flow;
   applying at the intervention point (M) a current pulse having an increased amplitude for melting down the short circuit;
   moving at the intervention point (M) the wire electrode parallel to the trim cutting path, from the intervention point (M) back to a stop point (H) and then again forward to the intervention point (M);
   increasing for a period of time at least one of the tension and the speed of the wire at the intervention (M);
   discontinuing for a certain period of time at the intervention point (M) the processing pulses;
   reversing for a period of time at the intervention point (M) the polarity of the processing pulses;
   moving at the intervention point (M) the wire electrode parallel to the trim cutting path from the intervention point (M) forward to a cleaning point (R) and then back again to the intervention point (M).

12. The method according to claim 11, further comprising a step of a) applying at least one of the measures as a first measure for short circuit elimination;

b) determining and saving at least one of the success ratios as given by the short circuit duration and the number of successful short circuit eliminations;

c) sorting at least one of the sequence and combination according to the success ratios; and d) applying, during subsequent occurrences of short circuits, measures for short circuit elimination based on the sorted data of step c).

13. The method according to claim 12, wherein the most probable causes for short circuits are determined based on the distribution of the success ratios of the various measures for short circuit elimination, and the measures to eliminate the causes for short circuits are implemented based on the results of the determination of the success ratios.

14. The method according to claim 13, further comprising a step of changing the rate of speed for the elimination of the causes for short circuits for providing the first measure for the elimination of causes.

15. The method according to claim 13, further comprising a step of changing the nominal controller setting for the servo speed (S) for the elimination of the causes for short circuits for providing the first measure for the elimination of causes.

16. The method according to claim 13, further comprising a step of changing the offset value of the trim cutting path for the elimination of the causes for short circuits for providing the first measure for the elimination of causes.

17. The method according to claim 13, further comprising a step of changing at least one of the wire tension and the wire speed for providing the first measure for the elimination of the causes for short circuits.

18. The method according to claim 13, further comprising a step of changing at least one of the pressure and flow of the flushing agent for the elimination of the causes for short circuits for providing the first measure for the elimination of causes.

19. The method according to claim 13, further comprising a step of activating at least one of a wire cleaning device and a wire alignment device for the elimination of the causes for short circuits for providing the first measure for the elimination of causes.

20. The method according to claim 13, further comprising the steps of:

interrupting the erosion machining process; and servicing the spark erosion apparatus based on the observed causes for the elimination of these causes for short circuits for providing the first measure for the elimination of causes.

21. A spark erosion apparatus for trim cutting by fine machining with spark erosion of a workpiece with a wire electrode, comprising a) a monitor for continuously monitoring one gap parameter for the detecting a short circuit, the monitor having b) control means connected to the monitor, said control means comprises:

b.1) arrest means, which after receiving an output signal from the monitor indicating that a short circuit has been detected, arrest the forward motion of the electrode at the point (K) where the short circuit occurred;

b.2) first moving means, which if the short circuit persists, move the electrode away from the workpiece to an intervention point (M)—in a direction perpendicular to the path used for trim cutting;

b.3) execution means which at the intervention point (M) executes at least once at least one measure to eliminate the short circuit; and b.4) second moving means, which, after detecting that the short circuit is eliminated, moves the electrode back to the point (K) where the short circuit occurred, whereafter machining continues.

22. The spark erosion apparatus, according to claim 21, wherein the control means is programmed with a first algorithm which a) applies, in the event of a short circuit, measures for short circuit eliminations;

b) determines success ratios as given by at least one of the short circuit duration and the number of successful short circuit eliminations;

c) sorts at least one of the sequence and combination according to the success ratios; and d) induces, during subsequent occurrences of short circuits, measures for short circuit elimination based on newly sorted data.

23. The spark erosion apparatus, according to claim 22, wherein the control means is programmed with a second algorithm for pattern recognition which determines the most probable causes for short circuits based on the distribution of the success ratios of the various measures for short circuit elimination, and indicates the existence of short circuits and the most likely causes based on the results of this determination.

24. The spark erosion apparatus, according to claim 23, further comprising means, implementing the second algorithm, for displaying recommendations for eliminating the causes of short circuits.

25. The spark erosion apparatus, according to claim 23, wherein the control means is programmed with a third algorithm which determines the frequency of short circuits based on the results of the second algorithm; and the control means initiates at least one measure to eliminate the causes of the short circuits if the frequency of short circuits is higher than a first limit, and cancels the measures again after at least one of a time and a frequency of short circuits is lower than a second limit.

26. The spark erosion apparatus, according to claim 25, wherein the control means activates a transverse servo system to adjust the offset value of the trim cutting path if a short circuit is present.

27. The spark erosion apparatus according to claim 25, wherein, in the design of at least one of the first, second and third algorithms, fuzzy logic is utilized.

* * * * *